United States Patent [19]

Kannengiesser et al.

[11] Patent Number: 5,225,621
[45] Date of Patent: Jul. 6, 1993

[54] PROCESS FOR PRODUCING A JACKETED FUSE AND FUSE PRODUCT

[75] Inventors: Werner Kannengiesser, Troisdorf; Karl-Heinz Lülsdorf, Troisdorf-Spich; Franz-Josef Biermanns, Troisdorf; Hans-Heinz Heidbüchel, Cologne, all of Fed. Rep. of Germany

[73] Assignee: Dynamit Nobel Aktiengesellschaft, Troisdorf, Fed. Rep. of Germany

[21] Appl. No.: 783,130

[22] Filed: Oct. 28, 1991

[30] Foreign Application Priority Data

Oct. 27, 1990 [DE] Fed. Rep. of Germany ....... 4034264

[51] Int. Cl.⁵ ............... F42B 3/10; F42B 4/00; F42D 1/08
[52] U.S. Cl. ................... 86/22; 102/275.1; 102/275.8; 102/202.12; 493/948
[58] Field of Search ............. 86/20.1, 22, 1.1; 102/202.12, 202.14, 200, 275.1, 275.8; 493/948

[56] References Cited

U.S. PATENT DOCUMENTS 2,685,813 8/1954 Lampman et al. ............... 65/60
3,712,222 1/1973 Richardson et al. ............ 102/200
3,968,724 7/1976 Kowalick et al. ............... 86/20.1
4,913,053 4/1990 McPhee ..................... 102/275.8

FOREIGN PATENT DOCUMENTS 2021702 2/1971 Fed. Rep. of Germany.
2159724 6/1973 France.
2204932 11/1988 United Kingdom.

*Primary Examiner*—J. Woodrow Eldred
*Attorney, Agent, or Firm*—Antonelli, Terry, Stout & Kraus

[57] ABSTRACT

A fuse having a protective jacket is utilized, for example, in petroleum exploration at large depths where the fuse must withstand high temperatures and pressures. The jacket is produced from a shrinkable hose that is shrink-fitted onto the unfinished cord which latter contains an explosive. The hose consists preferably of radiation-crosslinked polyethylene. The use of a shrink-fitted hose eliminates long preparation and curing times for the synthetic resin jacket. The process temperatures required during heat shrinking are no threat to the safety against ignition of the explosive. It is possible in accordance with the process to manufacture, in particular, fuses for high pressures and high ambient temperatures, without any problems.

12 Claims, 2 Drawing Sheets

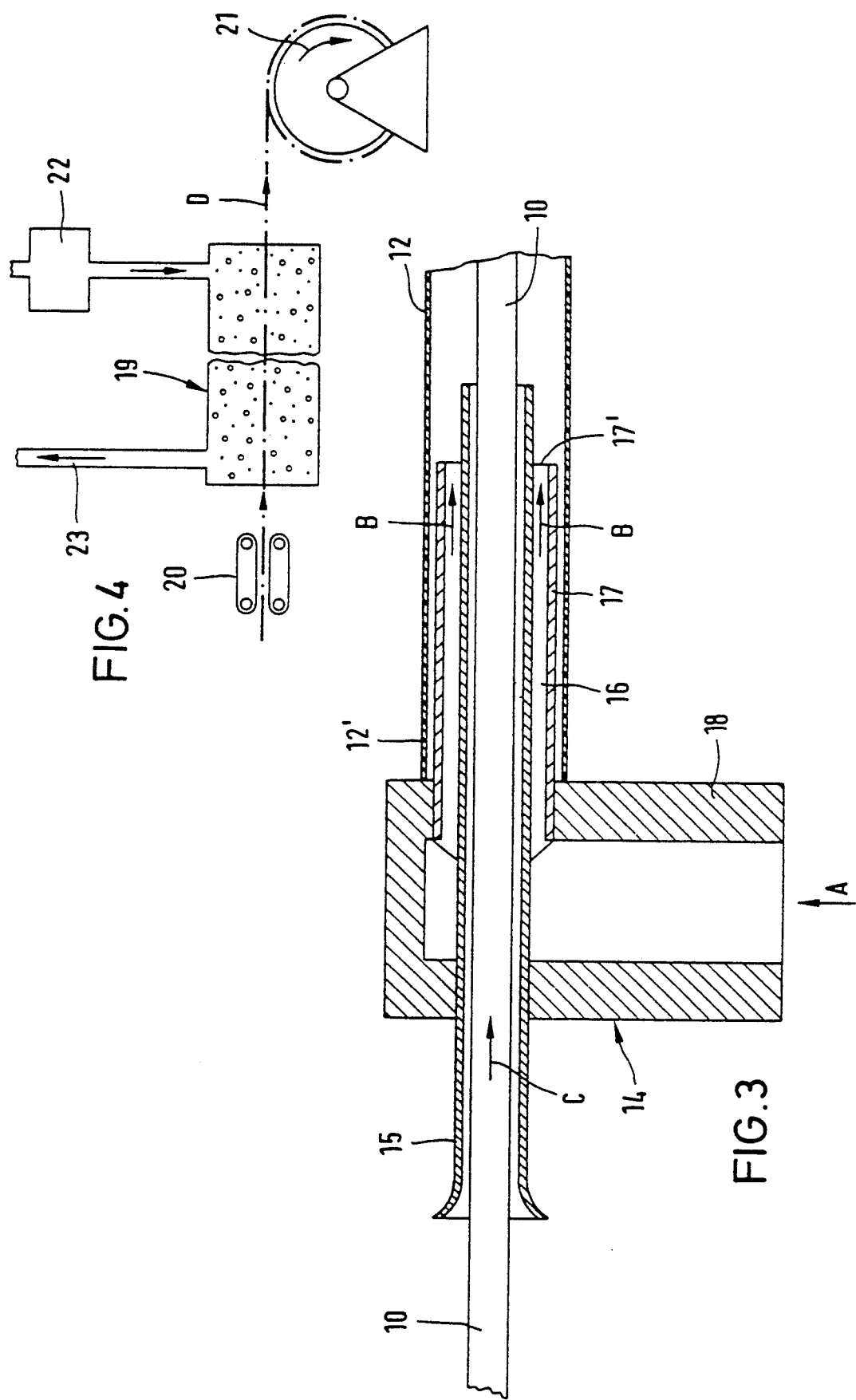

PROCESS FOR PRODUCING A JACKETED FUSE AND FUSE PRODUCT

BACKGROUND OF THE INVENTION

The invention relates to a process for producing a jacketed fuse which must withstand high temperatures and pressures, wherein an unfinished core of explosive material is surrounded by a jacket of a synthetic resin which is shrinkable and to the fuse product.

German Utility Model 7,003,114 discloses a fuse resistant against increased temperatures and pressures. Such fuses are required, for example, for seismic measurements of geological formations wherein the depth of the borehole can amount to more than 4,000 meters, with rock temperatures of between 130° and 200° C. and pressures of up to 1,500 bar. The conventional fuse consists of an unfinished cord, made up of a wrapped and/or a braid-encased explosive core, and a sealing jacket. Film strips of a temperature- and pressure-resistant material are utilized for the sealing jacket. The sealing jacket is covered, in turn, with still further braided threads. Wrapping of the unfinished cord with film strips is a complicated and expensive procedure and harbors the danger of leakages. Therefore, in addition to the sealing jacket, an external jacket is additionally needed and is made up of a solution applied by a dipping method. Such an external jacket, however, due to its minor layer thickness and on account of nonuniform layer thicknesses, can only provide a limited protective function.

It is furthermore known to provide an unfinished cord which contains an explosive with a jacketing produced by hot extrusion of a synthetic resin, for example polyethylene. The synthetic resins suitable for hot extrusion require high extrusion tempertures of about 200° C. Since the unfinished cord contains an explosive, according to the nature of the explosive used in a particular case, a considerable safety risk is incurred during encasing of this unfinished cord with a hot plastic, because there is the danger that the explosive will be ignited. In order to conteract this danger, the jacketing is applied by a cold extrusion method, using cold-extrusible synthetic resins which are subsequently hardened by drying. The preparation of the raw material extrudable composition necessary for this purpose takes at least three weeks, and at least six additional weeks are needed for curing the jacket. This extraordinarily prolonged manufacturing process is accompanied by considerable costs and large expenditure for storage.

SUMMARY OF THE INVENTION

This invention is based on the object of designing a process for forming a protective jacket on an unfinished explosive-containing cord in such a way that the jacket can be applied to the unfinished cord in an economical fashion, rapidly, and without any major safety risk.

This object has been attained in accordance with this invention by positioning a hose or tubular element made of a shrinkable resin around the unfinished cord and shrinking the resin to tightly engage the cord and to form a protective sealing jacket.

In the process of this invention, a shrinkable stretched hose is utilized as the synthetic resin jacket or casing; this hose is shrink-fitted onto the unfinished cord. The shrinking step can be performed, for example, by contact with air. The synthetic resin material required for this purpose is packaged in a vacuum- an/or air-tight fashion. Upon opening of the package, the shrinking process commences. In particular, however, the shrinking is caused under the action of heat. A shrinkable polymer or resin suitable for the hose is, in particular, shrinkable crosslinked polyethylene. However, it is likewise suitable to use other shrinkable polymers, such as, for example, shrinkable crosslinked "Neoprene" or "Viton". Radiation-crosslinked polymers are employed with preference. Although heat is utilized especially for the shrinking step, the temperatures needed for this purpose are not so high as to seriously evoke the danger of ignition of the explosive.

The process of this invention is especially suitable for the manufacture of fuses which must exhibit high temperature stability and pressure resistance in order to meet, for example, the requirement of a temperature stability of 180° C. and a pressure resistance of 1,000 bar over a time period of at least two hours without any problems. A casing of PVC would not be suited for such a fuse inasmuch as PVC softens at about 100° C. Of course, in case of a fuse having the required properties, the unfinished cord must also be designed for being resistant against pressure and temperature to the respectively necessary extent.

A suitable process for introducing the unfinished cord into the not yet shrunk hose of stretched synthetic resin provides that a gas, for example air, is blown through the hose, and the unfinished cord is entrained by the air in accordance with the injector principle. Fuses can have a length of several meters, e.g. 20 meters. Introduction of the unfinished cord into the hose then takes place by the injection of air. After introduction, a further positioning step can, of course, be carried out additionally by further insertion of the cord by hand.

The invention furthermore concerns a fuse manufactured according to the process of this invention wherein the jacket consists of a shrink-fitted hose. The jacket is, under tension, in firm contact with the periphery of the unfinished cord and adapts to the contours of the cord while the thickness of the jacket is the same at all points.

The process according to this invention has the advantage of low process temperatures which are acceptable from a safety standpoint. There is no need for long preparation and curing times.

BRIEF DESCRIPTION OF THE DRAWINGS

The invention will be described in greater detail below with reference to the accompanying drawing wherein, in schematic representation and at varying scale:

FIG. 3 shows a fragmentary view of a device for introducing the unfinished cord into the hose; and FIG. 4 shows the heating tunnel with accessories for the shrink-fitting of the hose.

DETAILED DESCRIPTION OF THE INVENTION

According to the drawings, an unfinished cord 10 which contains an explosive and is wrapped or encased by one or several cover layers is provided with a jacket 11 firmly surrounding the unfinished cord 10 under tension. The unfinished cord 10 contains, for example, an explosive stable up to about 180° C. and up to a pressure of about 1,000 bar. Such an explosive is octogen, for example.

For the casing, a heat-shrinkable, prestretched and preformed hose 12 stabilized by radiation crosslinking is utilized; the internal diameter of this hose is larger, preferably substantially larger, than the diameter of the unfinished cord 10. This hose 12 is out to the same length as the unfinished cord 10, for example to a length of 20 m. Then—as described in greater detail in connection with FIG. 3—air or another gas is blown into the hose 12 and, at the same time, the unfinished cord 10 is introduced into the hose 12. The unfinished cord 10 is entrained by the gas flowing through the hose 12.

Figure 1:
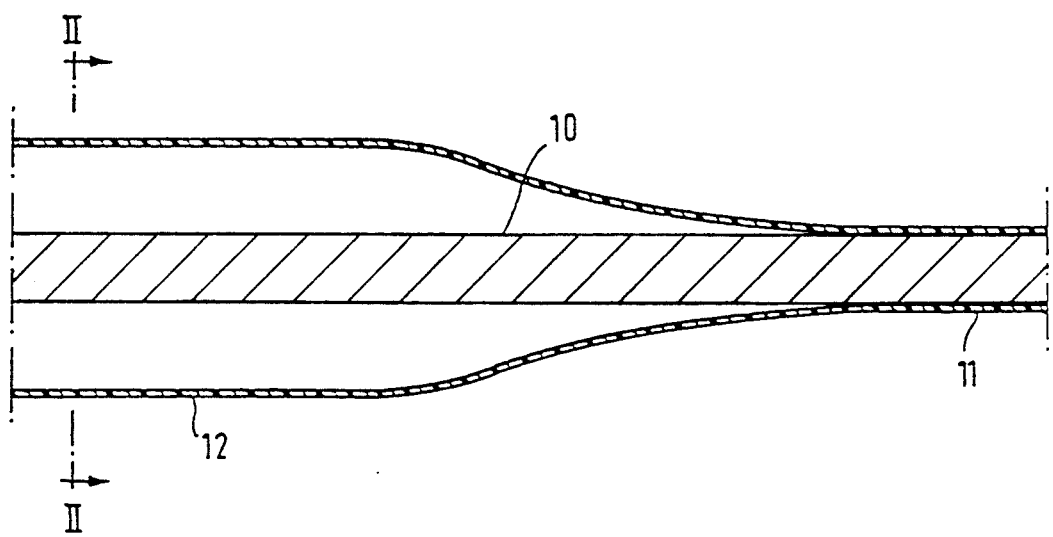
FIG. 1 is a longitudinal section showing the situation during shrink-fitting of the hose onto the unfinished cord shown in plan view.
Figure 2:
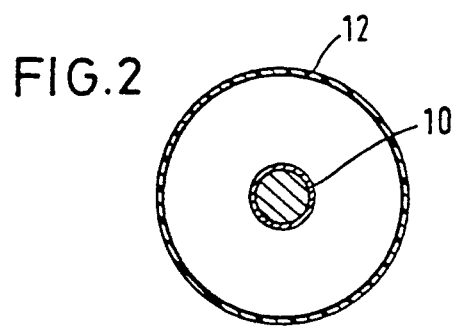
FIG. 2 shows, for clarifying the dimensions, a section along line II—II of FIG. 1.

In FIG. 1, to simplify the illustration of the drawing, the unfinished cord 10 is shown coaxially arranged in the hose 12; whereas in reality the cord is in contact with the inner wall of the hose 12 in the lower zone of the latter, as indicated in FIG. 2 by the circle 13 in dot-dash lines.

In the injector device 14 shown in a sectional view in FIG. 3, the unfinished cord 10, illustrated in plan view, is extended through the feeding tube 15. This tube is surrounded by the air-conducting tube 17 with formation of an annular gap 16. Both tubes 15, 17 are held in the housing 18 in mutually coaxial arrangement. The nipple-like air-conducting tube 17 serves simultaneously for accommodating one end 12' of the shrinking hose 12, the hose end pushed over the nipple is optionally pressed into contact therewith additionally by hand. When feeding air under pressure to the housing 18 in correspondence with arrow A, then this air flows—as indicated by the arrows B—at a correspondinqly increased velocity through the annular gap 16 and exits at the end 17' from the air-conducting tube 17 and thus enters the hose 12, entraining the unfinished cord 10 thereby according to arrow C in correspondence with the injector principle. The unfinished cord 10 is transported during this step, so to speak, on an air cushion and drawn into the hose 12. The diameter of the unfinished cord can here amount up to about 20 mm.

Once the unfinished cord 10 has been positioned in the hose 12 by air entrainment, thermal shrinking of the previously stretched hose takes place, for example with the aid of an annular hot-air blower through which the hose 12 is passed together with the unfinished cord 10; or, conversely, this blower is passed thereover. However, with preference, shrinking takes place by means of a heating tunnel 19 shown schematically in FIG. 4. Under practical conditions, this heating tunnel has a length of about 5 m and is controlled to be at a temperature of about 150° C. The hose 12 with the unfinished cord 10 disposed therein is passed—according to the arrow D—through the heating tunnel at a rate of 1 m/min. This is done by effecting the introduction by way of a belt feed 20 and the winding-up step via a take-off means 21. The feed and take-off means are adapted to each other so that the cord 10, 12 is tensioned in the heating tunnel 19. Temperature control of the heating tunnel 19 is accomplished by means of hot air introduced by means of the hot-air blower 22 and exhausted via the conduit 23. During this step, the hose 12 is shrunk, coming into firm and tight contact with the contour of the unfinished cord 10, with formation of the jacket 11, and surrounding this cord in a sealing fashion. The extent of reduction of the diameter of the hose 12 during shrinkage should range between 1 mm and 6 mm.

The shrinking temperatures are dependent on the type of stretched and preferably also crosslinked polymer employed, as well as on the temperature stability of the explosive in the unfinished cord 12. They are, for example for polyethylene, about 140°-300°0 C., for neoprene about 175°-300° C., and for "Viton" about 130°-150° C.

The hose 12 consists preferably of radiation-crosslinked polyethylene. In a preferred embodiment with an unfinished cord 10 having an outer diameter of 4.9 mm. the outer diameter of the hose 12 prior to shrinking is 6.5 mm, after shrinking of the hose 12 into firm and tight contact with the contour of the unfinished cord 10 the hose 12 has an outer diameter of 5.4 mm and a wall thickness of 0.25 mm. With an unfinished cord 10 based on octogen, this fuse has a temperature stability and pressure resistance of 180° and 1,000 bar, and 175° C. and 1,400 bar, respectively, over a time period of at least 2 hours.

What is claimed is:

1. A process for producing a jacketed fuse wherein a cord comprising a preshaped elongated explosive is surrounded by a synthetic resin jacket, characterized by positioning the cord within a shrinkable hose made of a synthetic resin which shrinks upon being contacted with an oxygen-containing gas said hose having an inner diameter that is substantially greater than an outer diameter of the cord, and contacting the hose with said gas to shrink the hose onto the cord to provide the jacketed fuse.

2. A process for producing a jacketed fuse wherein a cord comprising a preshaped elongated explosive is surrounded by a synthetic resin jacket, characterized by positioning the cord within a shrinkable hose made of a synthetic resin which shrinks upon being treated, said hose having an inner diameter that is substantially greater than an outer diameter of the cord, the non-jacketed cord being introduced into the hose by blowing a gas through the hose and entraining the cord with the gas, and treating the hose to shrink the hose onto the cord to provide the jacketed fuse.

3. A process according to claim 2, characterized in that the hose is made of a heat shrinkable synthetic resin and the hose is treated with heat.

4. A process according to claim 3, characterized in that the hose with the cord disposed therein is conducted through a heating tunnel to effect shrinking of the hose.

5. A process according to claim 3, characterized in that the hose consists of a crosslinked polymer.

6. A process according to claim 5, characterized in that the hose is polyethylene.

7. A process according to one of claim 1, characterized in that the hose outer diameter is reduced to aproximately one-half during the shrinking operation.

8. A jacketed fuse comprising a cord comprising a preshaped elongated explosive, which cord is surrounded by a jacket, characterized in that the jacket consists of a shrunk-fitted hose of synthetic resin which tightly contacts the outer contour of the core; the preshaped elongated explosive having a wrapping of a cover layer that is surrounded and contacted by said jacket.

9. A process for producing a jacketed fuse wherein a cord comprising a preshaped elongated explosive is surrounded by a synthetic resin jacket, characterized by positioning the cord within a shrinkable hose made of a synthetic resin which shrinks upon being treated, said hose having an inner diameter that is substantially greater than an outer diameter of the cord, and treating the hose to shrink the hose onto the cord to provide the jacketed fuse; the cord comprising the preshaped elongated explosive being wrapped in a cover layer and being disposed centrally within the hose with the formation of an annular air gap prior to treating the hose to shrink the hose onto the cord.

10. A jacketed fuse according to claim 8, characterized in that the shrunk-fitted hose and the fuse exhibit a temperature stability of at least about 150° C. and a pressure resistance of at least about 800 bar.

11. A jacketed fuse according to claim 8, characterized in that the hose consists of a crosslinked polymer.

12. A jacketed fuse according to claim 11, characterized in that the polymer is polyethylene.

* * * * *